Patented May 4, 1943

2,318,079

UNITED STATES PATENT OFFICE 2,318,079

FLUID COMPOSITION

Leon Paul Jehle, Buffalo, N. Y., assignor to Carbide and Carbon Chemicals Corporation, a corporation of New York No Drawing. Application March 26, 1941, Serial No. 385,308

5 Claims. (Cl. 252—73)

The invention relates to new fluid compositions, in particular high boiling, low freezing fluids useful as heat and pressure transmission media. It is especially concerned with fluids stable at elevated temperatures, and having other characteristics appropriate to a high temperature coolant for internal combustion engines, a liquid for maintaining constant high temperature heating baths and the like, or a pressure fluid for hydraulic brake and shock absorber systems. The essential object of the invention is to provide an improved fluid composition for the uses indicated.

I have found that a two component mixture of dimethyl phthalate and dimethoxy tetraglycol produces a fluid of excellent properties for high temperature heat transfer and hydraulic pressure purposes. These two components are homogeneously miscible with each other, and depending upon the specific boiling point, freezing point and other properties desired for the use intended, can be mixed in varying proportions within the range of 10% to 90% respectively of each ingredient. The dimethoxy tetraglycol, which may also be termed dimethyl ether of tetraethylene glycol, extends the liquid range, by lowering the freezing point of the dimethyl phthalate, and since both compounds are separately high boiling, their liquid mixture withstands elevated temperatures without evaporation. The viscosity of the mixed fluid is low, and entirely suitable for a circulating coolant or pressure liquid, and over a wide temperature range the viscosity does not change excessively. Other properties of value to the uses intended include stability at high temperatures, only slight hygroscopicity and no tendency to hydrolyze, a very low corrosive action on metals, unobjectionable effect on rubber or rubber substitutes, and freedom from serious toxicity or irritating odor.

A preferred fluid composition, which has proven by many tests and experiments to have particularly good properties as a high temperature cooling or heating medium, consists of equal proportions by volume of dimethyl phthalate and dimethoxy tetraglycol. This mixture remains liquid over an exceptionally broad temperature range, freezing below 0° C., and having a boiling point of 278° C. at 760 mm. pressure. The boiling point lies between the boiling temperatures of the individual components, which are 282° C. for dimethyl phthalate and 276° C. for dimethoxy tetraglycol, and the mixed fluid behaves substantially like a unitary liquid, with little or no preferential evaporation of either ingredient at elevated temperatures. The viscosity of the fluid is low, being only 7.5 centipoises at 25° C., or 0.67 centipoises at 120° C., and the specific gravity is 1.105 at 70° F. There is no tendency to hydrolyze, and otherwise the stability of the mixture is excellent, the latter showing no decomposition at temperatures as high as 300° F., even when aerated.

No significant deleterious attack by the fluid is evident on rubber, or the better known synthetic rubber substitutes; and the corrosive action on metals like iron and steel alloys, copper, brass and aluminum is practically negligible, as proven by exposure of samples of these metals to the liquid at 300° F. for a period of 500 hours. If the liquid is in contact with solder, especially under aerated conditions at high temperatures, it may be advisable to incorporate a solder-corrosion preventive; and addition of inhibitors to the fluid, when desired or considered necessary, is contemplated by the invention. As suitable solder-corrosion inhibitors, there are many available which have heretofore been used in an equivalent capacity, including silicate, arsenate, tungstate and molybdate salts, particularly of sodium, or organic nitro derivatives of phenols and related compounds. No limitations are intended with respect to specific inhibitor compounds for the purposes of this invention.

Among many possible uses of these new fluid compositions, an immediately important one is as a coolant for airplane engines and other internal combustion engines, designed to operate at higher and more efficient temperatures than can be maintained and controlled effectively by aqueous cooling solutions. From the cited properties of the new fluid those skilled in the art will recognize numerous other applications to which the fluid is excellently suited, and no restrictions as to use embodiments are intended by the present disclosure. The invention should not, in fact, be limited beyond the scope defined by the appended claims.

I claim:

1. A fluid composition consisting predominantly of a mixture of dimethyl phthalate and dimethoxy tetraglycol.

2. A high boiling, low freezing fluid composition consisting predominantly of a mixture of dimethyl phthalate and dimethoxy tetraglycol, in relative proportions of between about 10% and 90% by volume of each ingredient.

3. A high boiling low freezing fluid composition consisting predominantly of a mixture of dimethyl phthalate and dimethoxy tetraglycol, in relative proportions of about 50% by volume of each ingredient.

4. A high boiling, low freezing fluid composition of high heat stability for use as a heat and pressure transmission fluid, said fluid consisting predominantly of a mixture of dimethyl phthalate and dimethoxy tetraglycol, in relative proportions of between about 10% and 90% by volume of each ingredient, and containing a metal corrosion inhibitor.

5. A high boiling, low freezing fluid composition of high heat stability for use as a heat and pressure transmission fluid, said fluid consisting predominantly of a mixture of dimethyl phthalate and dimethoxy tetraglycol, in relative proportions of about 50% by volume, and containing a metal corrosion inhibitor.

LEON PAUL JEHLE.